T. J. SMULSKI.
ROAD RECORDER AND INDICATOR.
APPLICATION FILED SEPT. 7, 1920.

1,429,374.

Patented Sept. 19, 1922.
5 SHEETS—SHEET 1.

INVENTOR
THEODORE J. SMULSKI.
BY Featherstonhaugh & Co.
ATT'YS.

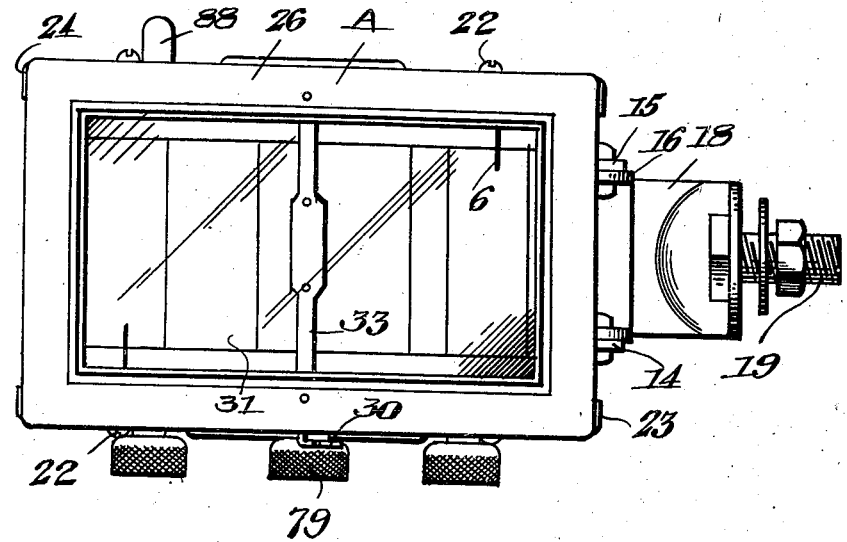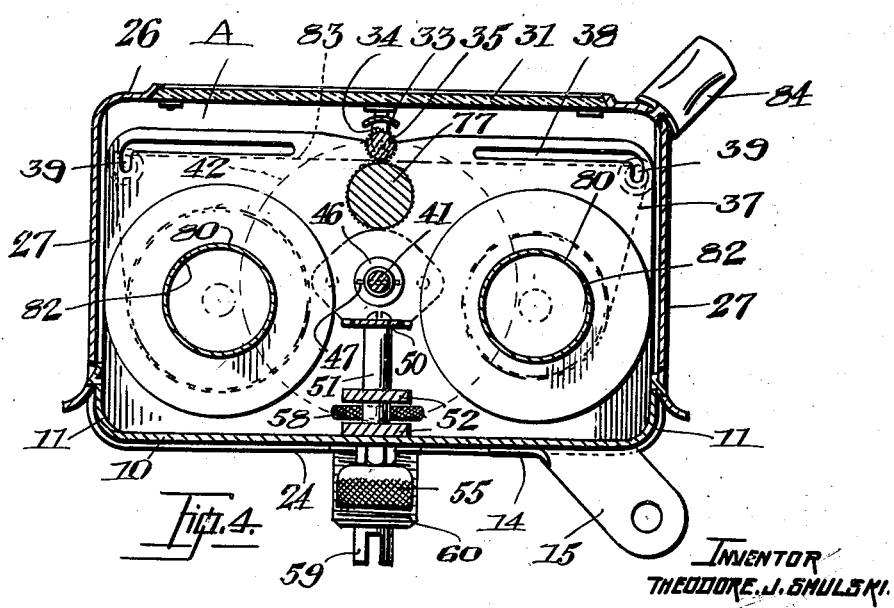

INVENTOR
THEODORE J. SMULSKI
BY Fetherstonhaugh & Co
ATTYS.

T. J. SMULSKI.
ROAD RECORDER AND INDICATOR.
APPLICATION FILED SEPT. 7, 1920.

1,429,374.

Patented Sept. 19, 1922.
5 SHEETS—SHEET 4.

INVENTOR
THEODORE J. SMULSKI
BY Featherstonhaugh & Co.
ATT'YS.

INVENTOR
THEODORE.J.SMULSKI.

Patented Sept. 19, 1922.

1,429,374

UNITED STATES PATENT OFFICE.

THEODORE JOHN SMULSKI, OF CHICAGO, ILLINOIS, ASSIGNOR TO ORRVILLE ERNEST JOSEPH, OF DETROIT, MICHIGAN.

ROAD RECORDER AND INDICATOR.

Application filed September 7, 1920. Serial No. 408,758.

*To all whom it may concern:*

Be it known that I, THEODORE JOHN SMULSKI, a citizen of Poland, a resident of the city of Chicago, county of Cook, State of Illinois, United States of America, have invented certain new and useful Improvements in Road Recorders and Indicators, of which the following is a specification.

This invention relates to improvements in road recorders and indicators, and the objects of the invention are to provide an instrument which will be driven from a suitable part of an automobile or like vehicle, and geared in a particular ratio relatively thereto, so that the machine will actuate a tape showing the course of travel of the automobile between predetermined points and bring to the driver's attention all points of interest therein and any regulations or traffic laws, etc., of the district through which the automobile is then passing, and any other information which would be of importance or interest to the driver or the passengers of the automobile, to provide means whereby any slipping of the tape can be readily rectified, and to simplify the controlling mechanism so that a reverse motion of the tape can be readily obtained.

Further objects still are to facilitate removing and positioning the roller carrying the tape, to simplify the construction of the rollers whereby they will be frictionally held in position and positively rotated in the desired direction, to adjust the speed of rotation of the tape, to provide means whereby a light can be positioned adjacent to the recorder and indicator, so that the driver of the automobile will be able to discern the tape at night as it is being moved below the glass of the recorder and be able to read on the tape the necessary instruction and advice printed thereon, and generally to adapt the recorder and indicator to better perform the functions required of it.

With the above and other objects in view, the invention consists essentially of the improved construction particularly described and set forth in the following specification and accompanying drawings forming part of the same.

In the drawings:

Figure 3 is a plan view of the improved recorder and indicator.

Figure 4 is a longitudinal section through the improved recorder and indicator showing the location of the rollers therein.

Like characters of reference refer to like parts in the several figures.

Figure 1:
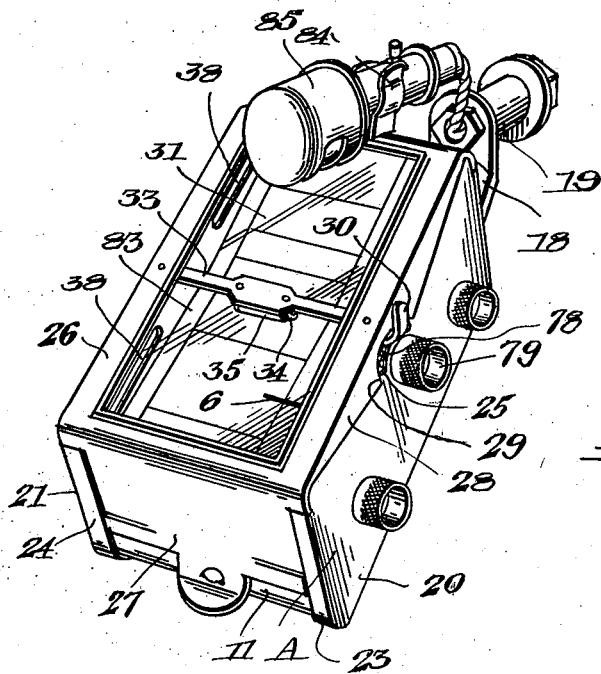
Figure 1 is a perspective view of the improved road recorder and indicator.
Figure 2:
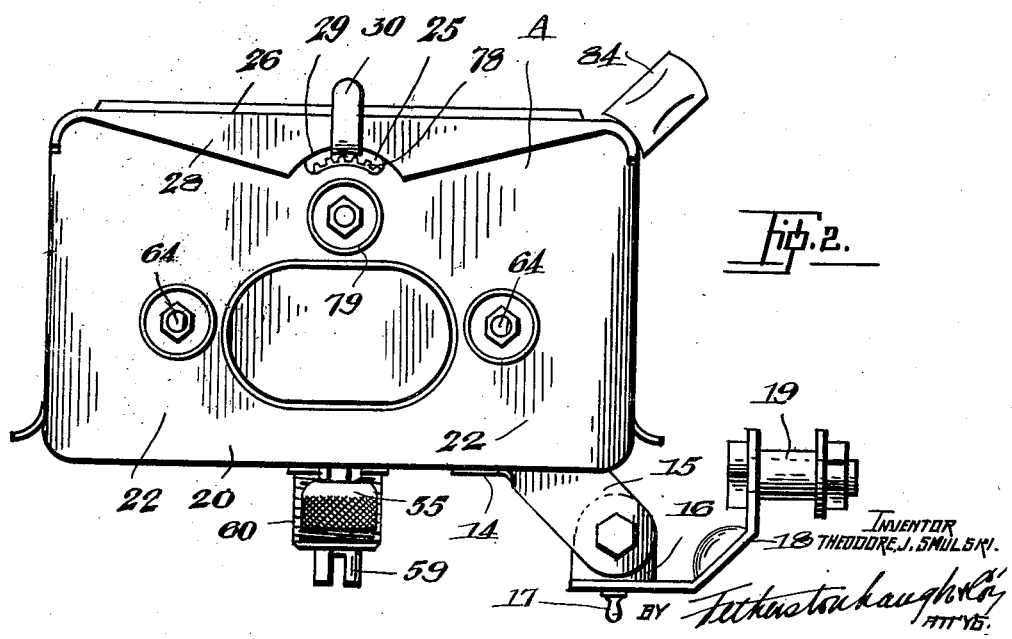
Figure 2 is a side view of the same.
Figure 6:
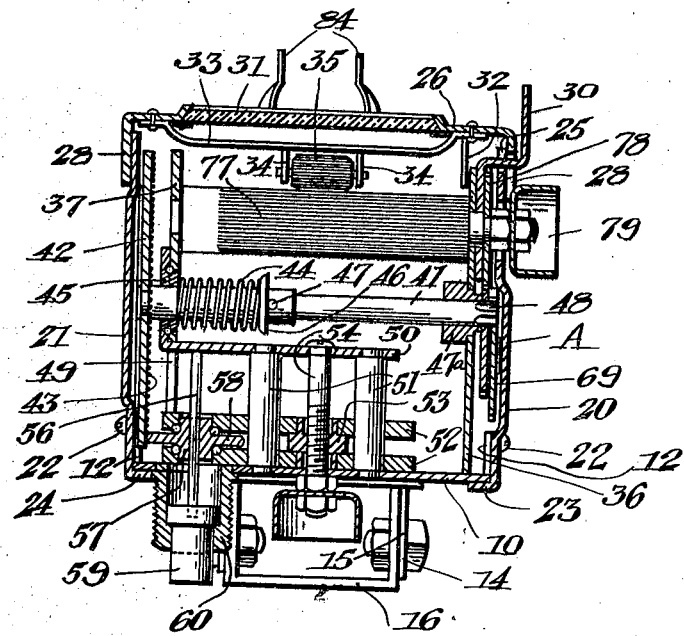
Figure 6 is a transverse section through the improved recorder and indicator.
Figure 5:
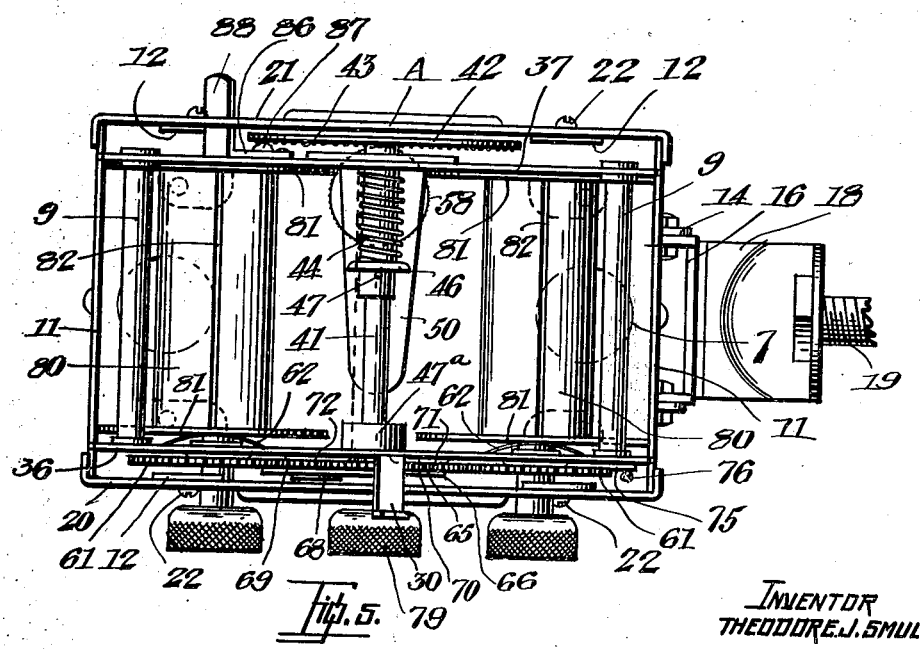
Figure 5 is a plan view of the improved recorder and indicator with the top removed.
Figure 7:
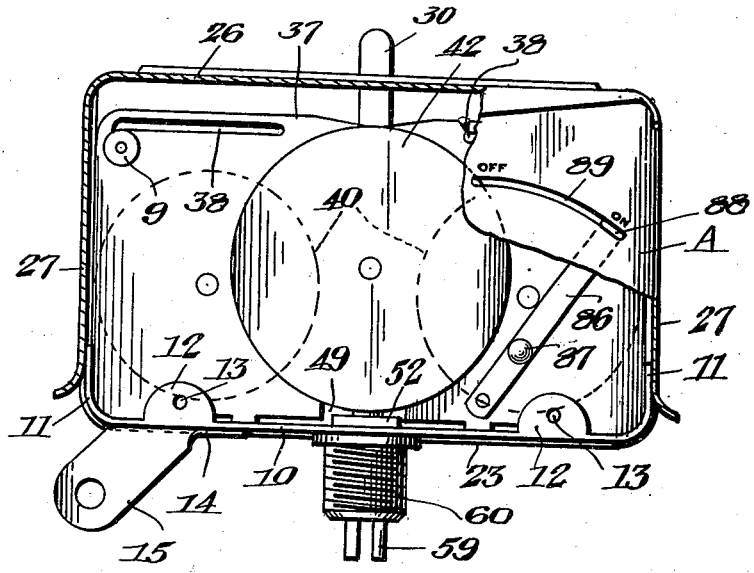
Figure 7 is an elevation of that side remote to the one shown in Figure 2, and with the side wall partly broken away to show the driving disc.

Referring to the drawings, A represents a preferred form of my invention illustrated in which the improved road recorder and indicator comprising a casing consisting of a lower wall 10 having upturned ends 11, the lateral edges of the lower wall 10 being formed with lugs 12 having threaded orifices 13 therethrough.

On this lower wall 10 a suitable bracket 14 is rigidly mounted and provided with a bifurcated end 15 to which the U-shaped member 16 is pivotally attached.

This U-shaped member 16 is connected by a thumb screw 17 or other suitable means to a bracket 18 carrying a tubular member 19, the object of which will be made clear hereafter.

The side walls 20 and 21 are attached to the lugs 12 of the lower wall 10 by screws 22, and the lower and end edges of said walls are formed with flanges 23 and 24, which embrace the edge of the lower wall 10 and also the upturned ends 11 of the said lower wall. The upper edge of the wall 20 is formed with a recess 25.

The cover 26 is formed integral with the end walls 27, which underlie the flanges 23 and 24 of the side walls 20 and 21 respectively, and the cover is provided with downwardly extending lateral flanges 28, which embrace the upper edges of the side walls 20 and 21.

One of the lateral flanges 28 is provided with an arcuate recess 29 in the lower edge thereof, the recess being formed concentrically with the lower edge of the recess 25 in the wall 20, thereby allowing the projecting handle 30, which passes through the orifice formed by the lower wall of the recess 25, and the arcuate recess 29 to be rotated to a limited extent either to the right or to the left.

The cover 26 is formed with an inspection panel or window 31 of glass or other suitable transparent material, and an angle bracket 32 depends from the cover into the interior of the casing.

A strip of spring or steel like resilient material 33 is attached at one end to the cover 26 and extends transversely below the inspection panel or window 31, and engages with the angle bracket 32, and this strip is provided with a pair of downwardly extending lugs 34 in which the pressure roller 35 is rotatably mounted.

The bottom wall 10 of the casing carries a pair of upwardly extending walls 36 and 37 which are spaced from the walls 20 and 21 respectively of the casing, and the walls 36 and 37 carrying the actuating mechanism of the recorder and indicator.

The walls 36 and 37 are provided adjacent to the upper edge with elongated orifices 38 provided with suitable offset ends 39, and in these slots transversely extending guide rollers 9 are adjustably and rotatably mounted.

The wall 37 carries a pair of rotatably supported discs 40, and a spindle 41 extends across the casing and is rotatably supported by bearings 45 and 47$^a$ in the walls 37 and 36. That end of the spindle 41 which projects beyond the wall 37 is provided with a driving disc 42 having a serrated or roughened inner face 43, and a spiral spring 44 encircles the spindle 41 and is located between the bearing 45 and the washer 46 which coacts with the pin 47 extending through the said spindle.

The opposite end of the spindle 41 extends through a bearing 47$^a$ carried by the wall 36 and is formed to constitute a gear 48.

A portion 49 of the wall 37 between the discs 40 is cut away, and suitable bracket 50 extends through this cutaway portion and has one arm engaged with the bearing 45 and secured to the wall 37, the other arm being arranged in parallel relation to the bottom wall 10 of the casing.

A pair of posts 51 hold the bracket 50 in the desired spaced relation from the bottom wall 10 of the casing giving the necessary rigidity thereto, and slidably mounted on the posts 51 is a frame comprising a pair of spaced plates 52 with a distance piece 53 therebetween formed like a nut.

This distance piece 53 makes threaded engagement with the screw 54 which is journalled at the upper end in the bracket 50 and passes through the lower wall 10 where it is connected to a finger grip 55 by suitable nuts.

On rotating the finger grip 55 the frame constituted by the plates 52 will be elevated and lowered.

A squared spindle 56 passes through the hub 57 of a driving disc 58 which is rotatably mounted in a roller bearing between the plates 52, and this hub makes sliding engagement with the spindle 56, the lower end of which is connected to a clutch member 59 which is rotatably mounted in the sleeve 60 attached to the bottom wall 10.

This sleeve 60 is threaded externally to engage with a nut carrying another clutch member of a flexible shaft (not shown) which will coact with the member 59 to transmit rotary motion to the spindle 56, which in turn will rotate the driving disc 58 coacting with the serrated face 43 of the disc 42, and rotary motion is thus transmitted to the spindle 41.

By moving the frame constituted by the plates 52 inwardly into the casing, the speed ratio of the disc 42 to the disc 58 will be adjusted, so that the rotation of the spindle 41 will be altered.

On the wall 36 and on the outer face thereof gears 61 are rotatably mounted on sleeves 8 which extend through the said wall, and are provided on the inner end with springs 62, which coact with the discs 63 carried by spindles 64 which extend through the said sleeves.

One of the gears 61 meshes with a gear 65 carried by a pin 66 rigidly attached to the wall 36 and the other gear 61 meshes with a gear 67 carried by a pin 68 attached to the wall 36. The pin 68 carries a second gear 69 which meshes with the gear 48 formed on the end of the spindle 41.

Pivotally mounted on the wall 36 is a plate 70 provided with an offset arm 30 which extends through the wall of the casing to the outside thereof, and this plate is formed with a pair of lugs on which the gears 71 and 72 are rotatably mounted.

The plate 70 is also provided with a serration 73 therein with which the offset end 74 of the bell crank lever 75 engages.

This bell crank lever is pivotally mounted to the wall 36 and one arm is connected to one end of the spring 76, the other end of which is anchored to the wall 36.

A roller 77 is rotatably mounted in the side walls 37 and 36, and the spindle of the roller carries a gear 78 which meshes with the gears 71 and 72.

The spindle of the roller 77 also extends beyond the wall 20 of the casing, and is attached to the finger grip 79 whereby the roller may be manually rotated externally of the casing.

The rollers 80 are designed to be frictionally retained between the discs 40 and 63 and suitable means whereby the rollers are positively engaged to the discs may be used. For instance the flanges 81 formed on the said rollers provide recessed outer faces which embrace the peripheries of the discs 63 and 40. Other equivalent structure could also be employed to give the same results.

The body portion of the roller 80 is formed with a peripheral longitudinally extending slit 82 for the reception of one end of the tape 83.

Adjacent to the window 31 of the cover a clamp 84 or other suitable means is provided to frictionally engage a lamp holder 85, which is so positioned that the light will be reflected into the interior of the casing and onto the face of the tape exposed below the window 31.

A brake lever 86 is provided being pivotally mounted adjacent to the disc 42 and provided with a projection 87 which coacts with the roughened face 43 of the said disc. This lever is pivoted to the wall 37 and provided with an offset end 88 which projects through the arcuate orifice 89 in the wall of the casing.

When this recorder and indicator is in use, the tape 83 is rolled on one roller 80 with the inner end engaging with the slit 82, and the tape is then passed around one of the rollers 9 between the roller 77 and 35, then over the other roller 9 when the end is engaged with the slit 82 of the second roller 80, the tape being slightly wound on the second roller.

In positioning the rollers, the orifices 7 in the bottom wall 10 of the casing permit the finger being inserted into the casing to assist in this positioning operation.

The recorder is mounted on an automobile in some suitable position and the electric wiring for the lamp is threaded through the tubular member 19. The recorder is now set at some definite point at the beginning of the journey, the point on the tape being located below the indicator or pointer 6 on the window 31.

On starting the journey the driver follows the course designated by the tape 83 as it is unwound from one roller 80 and wound on a second roller. The drive of the recorder is obtained through suitable mechanical or electrical means well known in the art and from some suitable part of the automobile such as the wheels.

It is very important that the speed ratio between the disc 58 and the disc 42 should be adjusted properly and to facilitate this operation, the driver actuates the finger grip 55 to move the frame constituted by the plates 52, so that the disc 58 will be at the desired distance from the centre of the disc 42.

Motion is transmitted from the spindle 56 to the disc 58 to the coacting disc 42, which in turn rotates the spindle 41 and the gear 48 formed on the end thereof.

This gear 48 rotates the gear 69 which simultaneously rotates the gear 67 and this last gear meshes with the gears 61 and 65, the latter of which meshes with the second gear 61.

Rotary motion is thus transmitted to the sleeve carrying the gear 61 and also to the spring 62 which coacting with the disc 63 rotates the same.

The rollers 80 are embraced between pairs of discs 40 and 63, so that the rotation of the disc 63 transmits rotation to the rollers 80.

It should be particularly noticed that the rollers 80 are rotated conjunctly and in such a manner as to give a certain amount of tensioning to the tape.

Figure 8:
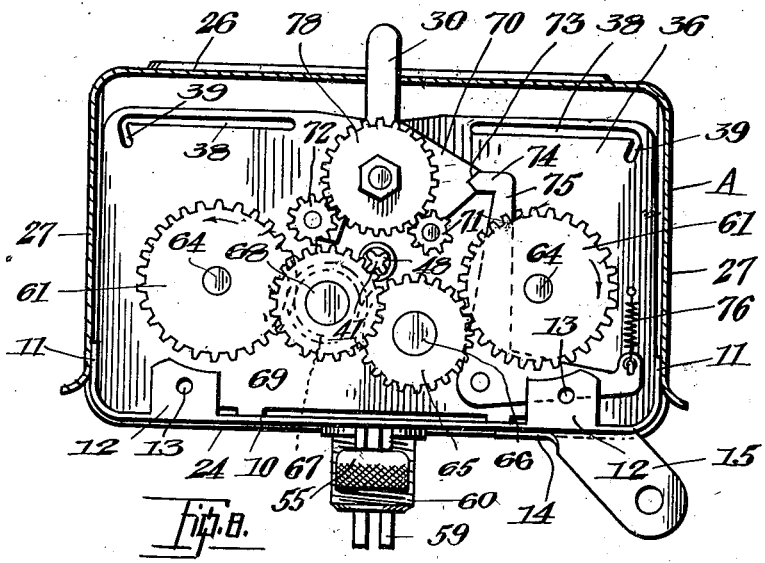
Figure 8 is a longitudinal section through the casing of the recorder and indicator showing the gearing controlling the rotation of the tape rollers, serrated roller, etc.
Figure 9:
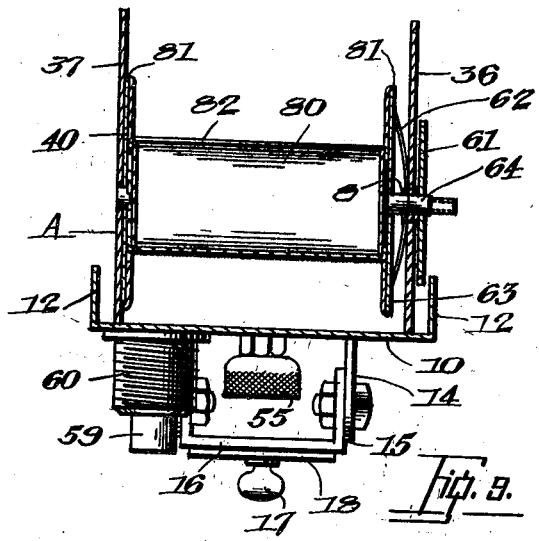
Figure 9 is a transverse section through part of the indicator and recorder showing the discs engaging the flanged rollers and the spring carried by the gear.
Figure 10:
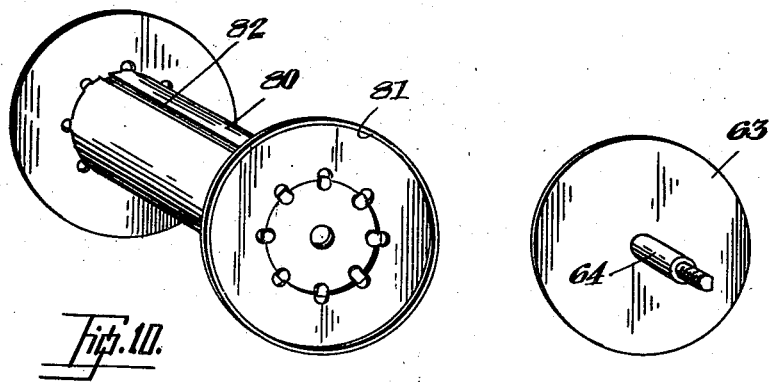
Figure 10 is a perspective view of one of the rollers.
Figure 11:
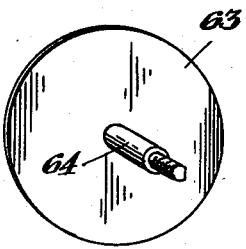
Figure 11 is a perspective view of one of the discs which coact with the tape rollers.
Figure 12:
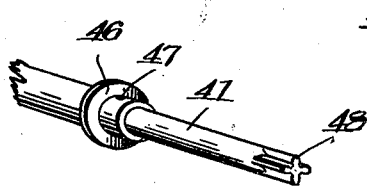
Figure 12 is a perspective view of the transverse spindle of the recorder and indicator.

The roller 77 has a serrated or roughened periphery and this roller is held in a neutral or non-driving position when the plate 70 is in the position illustrated in Figure 8.

To render the roller 77 active the hand grip 30 is rotated in a clockwise direction so that the gear 71 meshes with the gear 65 and motion will thus be transmitted through the gear 71 to the gear 78 and thence to the roller.

If the motion of the roller 77 is to be reversed, then the grip 30 is rotated in an anti-clockwise direction disengaging the gear 71 from the gear 65 and engaging the gear 72 with the gear 67.

Should it be desired at any time to correct the slip of the tape 83, the roller 77 is placed in neutral position as shown in Figure 8 and the said roller may be actuated externally of the casing by gripping the finger grip 79 and manually rotating the said roller.

The correction of such slip will always take place at some well defined landmark defined on the tape and by bringing such landmark under the pointer or index on the window when the automobile is standing at such land mark.

It should be particularly noticed that the plate 70 has the walls adjacent to the serrations 73 angularly-disposed at the same angle as the bevel point of the offset end 74 of the bell crank lever 75, so that when the plate 70 is in adjusted position, the bevelled edge of the offset arm will abut the adjacent edge of the plate 70 and prevent its being inadvertently moved by jarring or the like.

When the recorder is not in use, and the members of clutch 59 are disengaged, it may be locked by the lever 86, the projection 87 of which engages with the disc 42.

While I have particularly described a preferred form of the invention, such has only been to impart to others the idea of the operating of the invention and not with any intention of limiting my disclosure to the precise parts described.

As many changes could be made in the above construction and many widely different embodiments of my invention within the scope of the claims constructed without departing from the spirit or scope thereof, it is intended that all matter contained in the accompanying specification and drawings shall be interpreted as illustrative and not in a limiting sense.

What I claim as my invention is:

1. A road indicator and recorder comprising a casing, discs rotatably mounted in the frame, and tape receiving rollers having recessed flanges engaging with the discs, the said rollers being designed to be rotated in opposite directions.

2. A road indicator and recorder comprising a casing, discs in the casing, tape receiving rollers having recessed flanges engaging with the discs, a roller between the said rollers, means for rotating the first said rollers in opposite directions, means for rotating the last said roller simultaneously with the first said roller, means for rendering the last said roller non-rotary, means external of the casing whereby the last said roller may be rotated manually.

3. The road indicator and recorder claimed in claim 2, in which means are provided for reversing the motion of the last said roller.

4. The road indicator and recorder claimed in claim 1, in which springs coact with the discs to press the same into frictional contact with the flanges of the rollers, and means for rotating the springs.

5. The road indicator and recorder claimed in claim 2, in which a plate is mounted on the spindle of the last said roller, and a bell crank lever coacts with the said plate.

6. The road indicator and recorder comprising a casing, a pair of tape receiving rollers rotatably mounted in the casing, means for rotating the rollers in opposite directions, a roller intermediate of the said rollers, a plate on the spindle of the last said roller having a peripheral serration and inclined edges on opposite sides of the serrations, a bell crank lever having offset ends with a tapered point coacting with the said plate, and a train of gears connecting the rollers together.

7. A road indicator and recorder comprising a casing, discs rotatably mounted in the frame, tape receiving rollers engaged by the discs, a transversely extending spindle, friction discs controlling the rotation of the spindle, a train of gearing between the spindle and the first said discs, and a locking means engaging with one of the friction discs to prevent rotation of the spindle.

8. The road indicator and recorder claimed in claim 7, in which the locking means consists of a pivotally mounted lever having a projection adjacent to one end designed to underlie one of the friction discs, when moved into engagement therewith.

9. A road indicator and recorder comprising a casing, spaced side walls on the frame, gears mounted on sleeves, passing through one of the walls, springs on the sleeves, discs having spindles extending through the sleeves, a second set of discs on another wall, rollers embraced between pairs of discs, and a train of gearing meshing with the said gearing controlling the rotation of the rollers in opposite directions.

10. A road indicator and recorder comprising a casing, pairs of discs rotatably mounted in the casing, a tape receiving roller for each pair of discs, each roller having a disc at each end arranged to cooperate with the rotatable disc thereat, one cooperating disc constructed with a recess of a size to receive the other disc cooperating therewith, and means for conjointly rotating the first mentioned discs.

11. A road indicator and recorder comprising a casing, a plurality of pairs of spaced discs rotatably mounted in the casing, a tape receiving roller for each pair of discs positioned therebetween and carried thereby, each roller having a disc at each end arranged to cooperate with the adjacent rotatable disc, one cooperating disc constructed with a recess of a size to receive the other disc cooperating therewith, and means for rotating the first mentioned discs.

12. A road indicator and recorder comprising in combination, a casing, a plurality of pairs of spaced discs rotatably mounted in the casing, a tape-receiving roller for each pair of discs detachably carried by and positioned between said discs, each roller having a disc at each end arranged to co-operate with the adjacent rotatable disc, a driving spindle, a train of gearing operatively connecting the spindle and the second-mentioned discs whereby the rollers are conjointly rotated, frictional means for said spindle, and means for controlling said frictional driving means.

13. A road indicator and recorder comprising, in combination, a casing, a plurality of pairs of spaced discs rotatably mounted in the casing, a tape-receiving roller for each pair of discs detachably carried by and positioned between said discs, each roller having a disc at each end arranged to co-operate with the adjacent rotatable disc, a driving spindle, a train of gearing operatively connecting the spindle and the second-mentioned discs whereby the spools are continuously conjointly rotated, adjustable frictional driving means for said spindle, and means for controlling said frictional driving means.

14. A road indicator and recorder comprising, in combination, a casing, a plurality of pairs of spaced discs rotatably mounted in the casing, a tape-receiving roller for each pair of discs detachably carried by and positioned between said discs, each roller having a disc at each end arranged to co-operate with the adjacent rotatable disc, a driving spindle, a train of gearing operatively connecting the spindle and the said mentioned discs, whereby the spools and intermediate roller are continuously conjointly rotated, means for controlling the rotation of the intermediate roller, means for manually operating the same as desired to adjust the tape, adjustable frictional driving means for said spindle, and means for controlling said frictional driving means.

In testimony whereof, I have hereunto signed my name in the presence of two subscribing witnesses.

THEDORE JOHN SMULSKI.

Witnesses:
W. SORANSKI,
L. ZUKOWSKI.